United States Patent
Sivertsen

(10) Patent No.: US 9,424,586 B1
(45) Date of Patent: Aug. 23, 2016

(54) REMOTE SENSOR MANAGEMENT

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 317 days.

(21) Appl. No.: 14/030,826

(22) Filed: Sep. 18, 2013

(51) Int. Cl.
| | |
|---|---|
| *G06Q 30/00* | (2012.01) |
| *G06F 15/16* | (2006.01) |
| *A63F 13/00* | (2014.01) |
| *H04N 21/414* | (2011.01) |
| *G06Q 30/02* | (2012.01) |

(52) U.S. Cl.
CPC .................................. *G06Q 30/0241* (2013.01)

(58) Field of Classification Search
CPC .......... G06Q 30/00; G06F 15/16; A63F 13/00
USPC ........ 340/12.25; 345/158; 709/203, 219, 218, 709/14.4; 315/152; 750/14.58, 14.72
See application file for complete search history.

(56) References Cited

U.S. PATENT DOCUMENTS

| | | | |
|---|---|---|---|
| 6,571,279 B1 | 5/2003 | Herz et al. | |
| 7,146,567 B1 | 12/2006 | Duczmal et al. | |
| 8,413,153 B2 | 4/2013 | Harris et al. | |
| 8,898,255 B2 * | 11/2014 | Kim | ........................... 362/559 |
| 2002/0013757 A1 | 1/2002 | Bykowsky et al. | |
| 2003/0149601 A1 | 8/2003 | Cabral | |
| 2004/0015399 A1 | 1/2004 | Maggio | |
| 2004/0054589 A1 | 3/2004 | Nicholas et al. | |
| 2004/0174597 A1 | 9/2004 | Craig et al. | |
| 2007/0136133 A1 | 6/2007 | Li | |
| 2007/0288350 A1 | 12/2007 | Bykowsky | |
| 2009/0012868 A1 | 1/2009 | DeAngelis et al. | |
| 2009/0030788 A1 | 1/2009 | Boudah et al. | |
| 2009/0144157 A1 | 6/2009 | Saracino et al. | |
| 2010/0191600 A1 | 7/2010 | Sideman | |
| 2010/0295839 A1* | 11/2010 | Nagaya | ................. G06F 1/3265 345/212 |
| 2011/0035287 A1 | 2/2011 | Fox | |
| 2011/0106618 A1 | 5/2011 | Ben-Moshe | |
| 2011/0125588 A1 | 5/2011 | Turner et al. | |
| 2011/0178878 A1 | 7/2011 | Ballout | |
| 2011/0193872 A1* | 8/2011 | Biernath | .............. G09G 3/3406 345/589 |
| 2011/0282727 A1 | 11/2011 | Phan et al. | |
| 2011/0288915 A1 | 11/2011 | Mochizuki | |
| 2012/0047024 A1 | 2/2012 | Urban et al. | |

(Continued)

*Primary Examiner* — Nam V Nguyen
(74) *Attorney, Agent, or Firm* — Locke Lord LLP; Tim Tingkang Xia, Esq.

(57) ABSTRACT

Technologies are described herein for remote management of sensors and other functionalities in a digital signage device through a remote management server. In particular, a Digital Signage Control System ("DSCS") facilitates delivery of sensor command parameters to particular signage devices or a network of signage devices as specified in a Sensor Command Deployment Plan. After receiving various sensor commands from a user at a user interface, a Sensor Command Deployment Module generates a Sensor Command Deployment Plan ("SCDP"), which specifies which sensors or controls should be adjusted on signage device(s) and when the adjustments should be made. Subsequently, a Signage Communication Module ("SCM") waits for a request for sensor instructions from a signage device specified in the plan. Once the request is received, the SCM deploys specific instructions or commands (parameters) to a particular signage device wherein the command is executed at the signage device.

25 Claims, 4 Drawing Sheets

(56) References Cited

U.S. PATENT DOCUMENTS

| | | | |
|---|---|---|---|
| 2012/0130635 A1* | 5/2012 | Nakamura | G01C 21/206 701/465 |
| 2012/0130855 A1 | 5/2012 | Nielson et al. | |
| 2012/0150586 A1 | 6/2012 | Harper et al. | |
| 2013/0185162 A1 | 7/2013 | Mo | |
| 2013/0212619 A1 | 8/2013 | Yerli | |
| 2013/0313976 A1* | 11/2013 | Lin | H05B 33/0854 315/152 |
| 2014/0025499 A1* | 1/2014 | O'Donnell | G06Q 30/0261 705/14.58 |
| 2014/0035814 A1* | 2/2014 | de Lima | G06F 1/3265 345/158 |
| 2014/0067549 A1 | 3/2014 | Park et al. | |
| 2014/0122248 A1 | 5/2014 | Kuzama et al. | |
| 2014/0164131 A1* | 6/2014 | Kim | G06Q 30/0267 705/14.61 |
| 2014/0222578 A1 | 8/2014 | Poornachandran et al. | |
| 2014/0324944 A1* | 10/2014 | Christopher | H04L 67/025 709/203 |

\* cited by examiner

REMOTE SENSOR MANAGEMENT

FIELD

The present disclosure generally relates to sensor management, and more particularly to remote management of sensors of digital signage devices through a remote management server.

BACKGROUND

Traditionally, monitoring digital signage device sensors and adjusting various signage device parameters such as volume required a network administrator or billboard manager to physically interact with the signage device. For example, if an administrator responsible for managing all devices in a shopping mall desired to adjust the volume on each signage device, the sole recourse was for the administrator to walk to each individual signage device, increasing or decreasing the volume on each device. Further, if an administrator wanted to monitor information gathered by a signage device's sensors (e.g., the internal temperature of the signage device over a period of time), the administrator was required to go to the device, take the device out of display mode and place it into a monitoring mode, and then check the sensor information. By taking the signage device out of service to conduct such routine sensor monitoring, the billboard owner was losing valuable potential revenue. Further, the owner was losing additional revenue in the wasted man hours required to manually manage the signage devices as such a process is both time consuming and difficult to manage and supervise effectively.

Therefore, there is a long-felt but unresolved need for a system for remotely monitoring signage device sensors and adjusting signage device parameters.

SUMMARY

Technologies are described herein for remote management of sensors and other functionalities in a digital signage device through a remote management server. In particular, according to one aspect, a Digital Signage Control System ("DSCS") facilitates delivery of sensor command parameters to particular signage devices or a network of signage devices as specified in a Sensor Command Deployment Plan. After receiving various sensor commands from a user at a user interface, a Sensor Command Deployment Module generates a Sensor Command Deployment Plan ("SCDP"), which specifies which sensors or controls should be adjusted on signage device(s) and when the adjustments should be made. Subsequently, in one embodiment, a Signage Communication Module ("SCM") waits for a request for sensor instructions from a signage device specified in the plan. Once the request is received, the SCM deploys specific instructions or commands (parameters) to a particular signage device wherein the command is executed at the signage device.

A further aspect of the present disclosure relates to a method comprising the steps of receiving at the management server a user input from a remote computing device, wherein the user input includes information relating to a management function at the sensor; constructing at the management server an instruction comprising parameters for performing the management function; transmitting from the digital signage device to the management server a request for the instruction; upon receipt of the request, transmitting from the management server to the digital signage device the instruction; receiving at the digital signage device the instruction from the management server; constructing via the processor a command corresponding to the management function in accordance with the control protocol; and transmitting the command to the sensor via the controller.

One further aspect of the present disclosure relates to a non-transitory computer readable medium storing executable instructions configured to cause a computer system to execute a method comprising: receiving at a management server a user input from a remote computing device, wherein the user input includes information relating to a management function at a sensor in a digital signage device, wherein the digital signage device comprises a controller in accordance with a control protocol, and the sensor is in communication with the controller; constructing at the management server an instruction comprising parameters for performing the management function; transmitting from the digital signage device to the management server a request for the instruction; upon receipt of the request, transmitting from the management server to the digital signage device the instruction; receiving at the digital signage device the instruction from the management server; constructing via the processor a command corresponding to the management function in accordance with the control protocol; and transmitting the command to the sensor via the controller.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

These and other aspects of the present disclosure will become apparent from the following description of the preferred embodiments taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
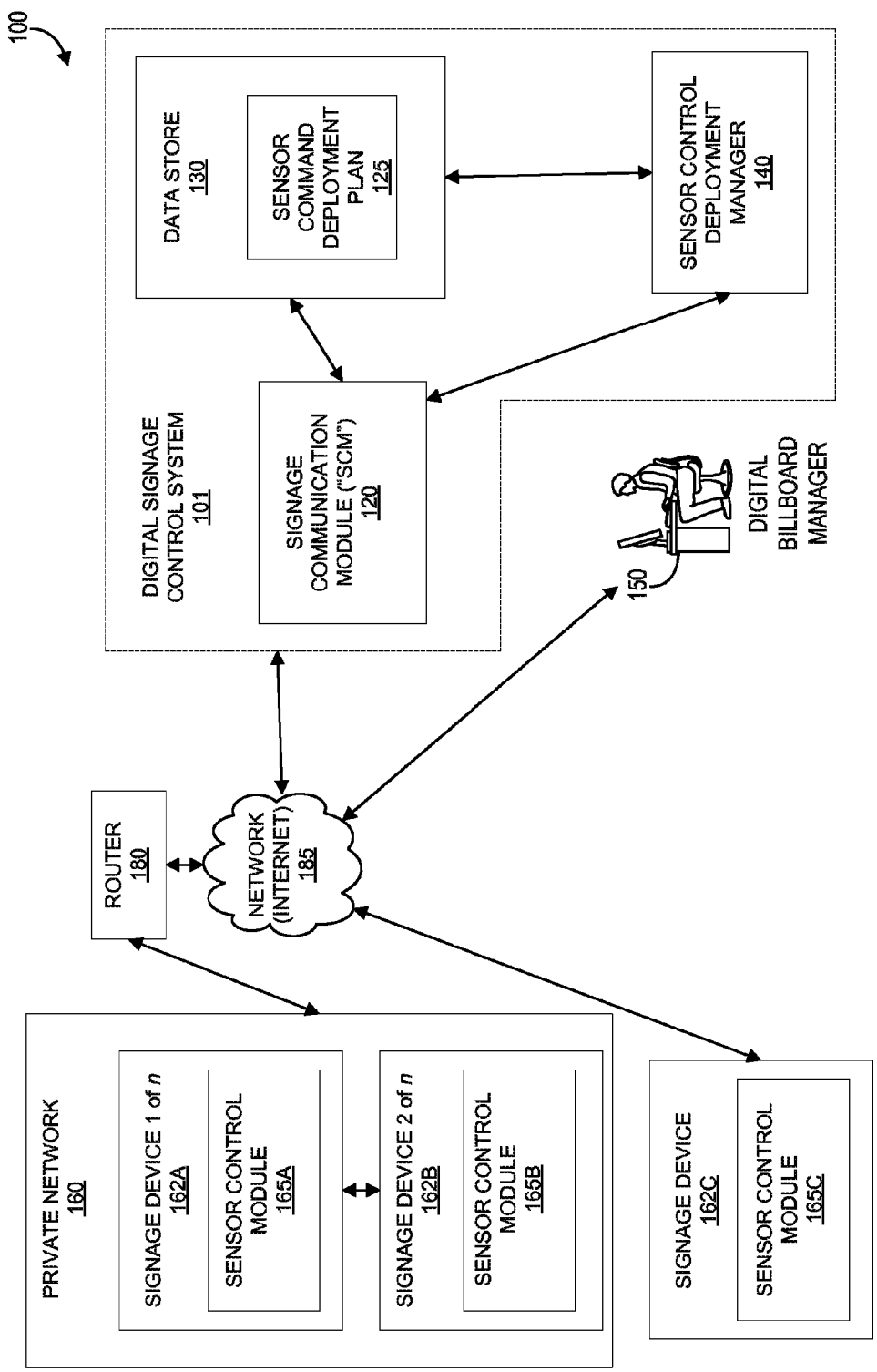
FIG. 1 illustrates an exemplary system environment in which an embodiment of the disclosed Digital Signage Control System ("DSCS") is utilized.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Aspects of the present disclosure relate generally to computer hardware and software systems for remotely managing sensors and other functionalities on a signage device. According to one aspect, a Digital Signage Control System ("DSCS") facilitates delivery of sensor command parameters to particular signage devices or a network of signage devices as specified in a Sensor Command Deployment Plan. As will be generally understood, signage device networks generally comprise one or more signage devices, which are operatively connected, inside, for example, a shopping mall. Further, according to one aspect and as will be generally understood, electronic communications to the signage devices from outside the network are controlled by a router or other device that manages such communications. Alternatively, various signage devices within the same general vicinity may comprise a signage device network (i.e., group of signage devices). Further signage devices which are not in the same general vicinity may comprise a signage device network, perhaps if the signage devices share a common owner. According to one aspect, after receiving various sensor commands from a user at a user interface, a Sensor Command Deployment Module generates a Sensor Command Deployment Plan ("SCDP"), which typically specifies which sensors or controls should be adjusted on the signage device(s) and when the adjustments should be made, which is stored in a Data Store of an DSCS. Subsequently, a Signage Communication Module ("SCM") module waits for a request for sensor instructions from a signage device specified in the plan. According to one aspect, once the request is received, the SCM deploys specific instructions or commands (parameters) to a particular signage device wherein the command is executed at the signage device. According to one embodiment, after deploying an instruction (parameter) to a particular signage device, the SCM updates the SCDP to indicate the instruction has been deployed.

Referring now to the figures, FIG. 1 illustrates an overview 100 of a Digital Signage Control System ("DSCS") 101 in an exemplary environment, constructed and operated in accordance with various aspects of the present disclosure. As shown in FIG. 1, the DSCS 101 is generally a single device comprising a Signage Communication Module ("SCM") 120 and Sensor Control Deployment Manager 140 for carrying out and coordinating various computer-implemented processes of the DSCS 101. The exemplary DSCS 101 likewise comprises a Data Store 130 for carrying out various other computer-implemented processes of the DSCS 101. Architectural details relating to various software modules, engines, and databases comprising an embodiment of the DSCS 101 are described in greater detail below in relation to FIGS. 1 and 2. Though shown as a single device, in certain embodiments, a DSCS 101 could be implemented in a cloud architecture.

As discussed and according to the embodiment shown in FIG. 1, an DSCS 101 is typically a single device comprising a SCM 120, a Data Store 130, a Sensor Control Deployment Manager 140, and various other software engines, modules, and databases, which are operatively connected. Generally, the DSCS 101 is in operative connection to various signage devices (e.g., 162C), signage device networks (e.g., 162A or 162B), and signage device manager user terminals (e.g., 150) through a network 185 such as the Internet. Typically, such operative connections involve a secure connection or communications protocol, and communications over a network typically involve the use of one or more services such as a Web-deployed service with client/server architecture, a corporate Local Area Network ("LAN") or Wide Area Network ("WAN"), or through a cloud-based system. As noted, according to a further embodiment not shown in FIG. 1 and as will be understood by one of ordinary skill in the art, an DSCS 101 may comprise a cloud-based architecture, or the functionalities can be carried out by a consolidated system, and it is unnecessary for these systems to be separate and discrete.

The DSCS 101 includes operative (and preferably) wireless connections to private signage device networks (e.g., 160) via an entry point such as a router 180. Although FIG. 1 only shows one private signage device network 160 and one independent signage device (e.g., 162C), it will be understood and appreciated by one of ordinary skill in the art that multiple private signage device networks and independent signage devices may be connected to an DSCS 101. Generally, independent signage devices are assigned a particular IP address, and signage devices within a private signage device network may be assigned private IP addresses. Generally, operative connections between an DSCS 101 and a private signage device network 160 involve a secure connection or communications protocol, such as Wireless Application Protocol (WAP). Moreover, in addition to routers 180, various networking components such as switches, hubs, etc., are typically involved in such communications, and although not shown in FIG. 1, certain embodiments of the present disclosure may include one or more secure networks, gateways, or firewalls that provide information security from unwanted intrusions and cyber-attacks.

Typically, a signage device network 160 as shown in FIG. 1 comprises one or more signage devices (e.g., 162A and 162B) configured to display digital media content. For example, signage devices can display facility-related announcements, weather updates, or multimedia content such as videos or movie clips. For example, in a shopping mall, a network of signage devices could be configured to simultaneously display information relating to a promotion at a store in the shopping mall, followed by a weather report, then an announcement informing patrons that an escalator was out of service, and then a commercial for a new soft drink. Likewise, independent signage devices can display multimedia content or various other announcements or advertisements.

Figure 2:
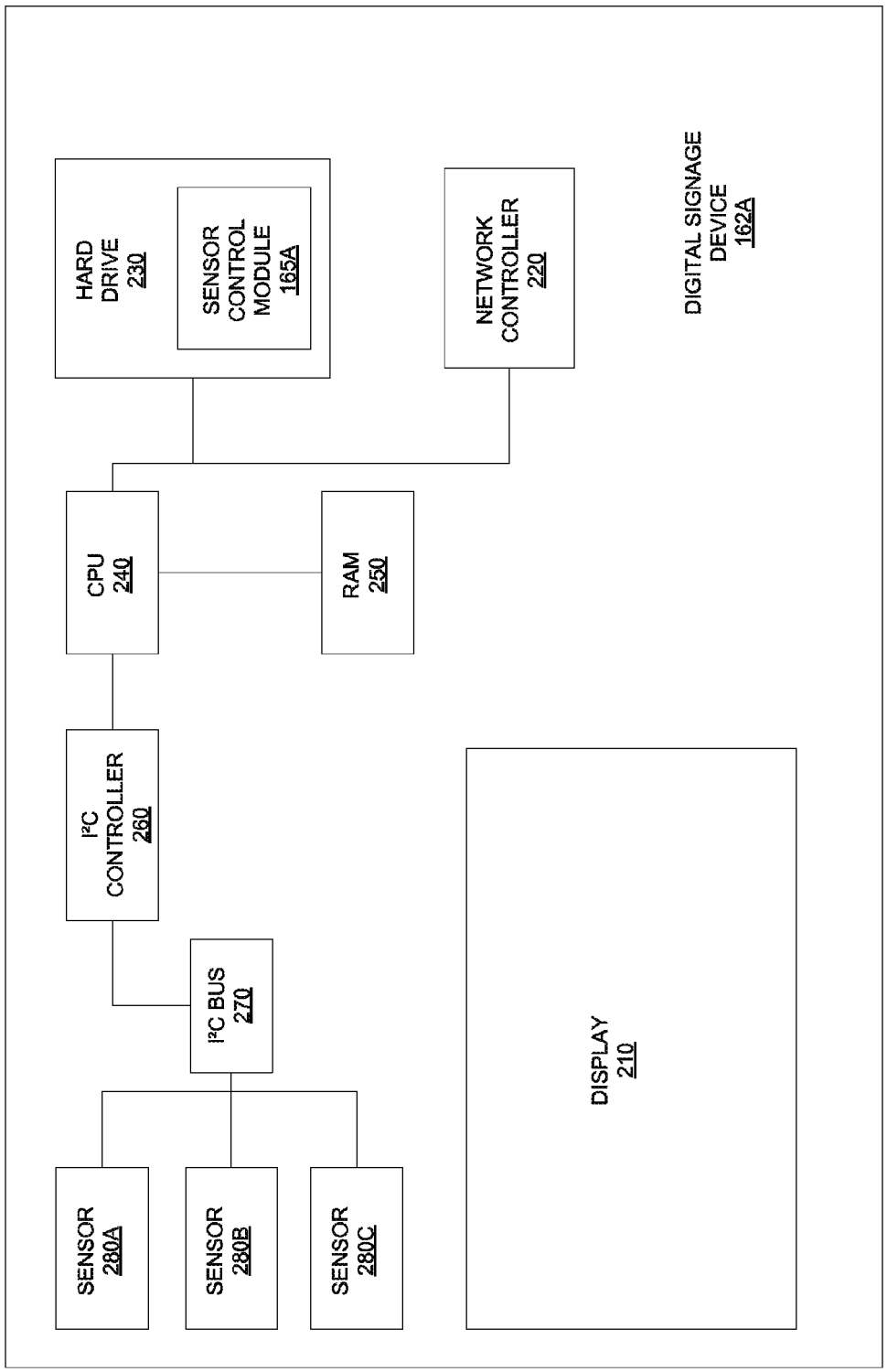
FIG. 2 illustrates an exemplary digital signage device.

FIG. 2 is an exemplary embodiment of a digital signage device 162A. As shown in the FIG. 2 embodiment, the signage device 162A includes a display 210 for displaying media content, announcements, and other information. Further, the signage device includes a network controller 220 for managing communications with other signage devices within the private network (e.g., 162B) or signage devices external to the private network (e.g., 162C). The network controller likewise manages communications with a device such as a router 180 for communicating with an external network such as the Internet 185. As shown in the FIG. 2 embodiment, the signage device 162A further comprises a non-volatile storage device (i.e., hard drive) 230, which includes a sensor control module 165A, as will be discussed herein. Additionally, the signage device includes a central processing unit ("CPU") 240 for carrying out various computer program instructions relating to the operation of the signage device 162A. Also, as shown in FIG. 2, the signage device 162A includes random-access memory ("RAM") 250. As will be understood by one of ordinary skill in the art, the RAM 250 allows for random access of stored data used in the management and operation of the signage device 162A.

As will be discussed further, as shown in the FIG. 2 embodiment, the signage device 165A also includes a controller 260 and bus 270 for transmitting instructions to and receiving information from the signage device's 162A various sensors (i.e., 280A, 280B, and 280C). According to the FIG. 2 embodiment, the controller 260 is an I²C controller and communicates with the sensors (i.e., 280A, 280B, and 280C) via and I²C bus 270. According to one aspect, a signage device may have a plurality of sensors (i.e., 280A, 280B, and 280C, etc.) for monitoring conditions internal and external to the signage device (e.g., internal temperature, external brightness, etc.).

As indicated, in one embodiment, each signage device is equipped with a Sensor Control Module ("SCM") (e.g., 165A, 165B, or 165C) for managing various signage device functionalities. Such functionalities may include adjusting parameters such as volume or picture-related properties such as hue, contrast, brightness, sharpness, or gamma. In general (and as will be discussed in greater detail herein), when a user or administrator at a user interface 150 inputs a command to modify a particular parameter (e.g., increase the volume) on a particular signage device (e.g., 162A), the DSCS 101 generates a Sensor Command Deployment Plan 125, which includes the parameters (i.e., increase the volume) for the specific signage device (i.e., 162A).

In one embodiment, a signage device 162 may be located in a private network behind the firewall, and thus the DSCS 101 typically cannot initiate a communication with the signage device 162. The signage device 162 can periodically (e.g., every 5 seconds) send requests to the DSCS 101 to inquire whether there is any parameter ready to be deployed to the signage device 162. Through the requests sent from the signage device 162, the DSCS 101 is able to temporarily establish a communication channel with the signage device 162 and subsequently send any ready-to-be-deployed parameters to the signage device 162. For example, once a signage device specified in the Sensor Command Deployment Plan 125 (i.e., 162A) requests instruction, the DSCS 101 transmits to the signage device 162A the specified parameters, where they are received by the signage device's Sensor Control Module 165A. According to various embodiments, the parameters may be in the JSON format, may be a CSV file, or may be in an XML-based format.

Upon receipt of the parameters, according to one embodiment, the SCM 165A manages the implementation of the command. In one embodiment, the SCM 165A communicates with the signage device's various sensors (e.g., 280A, 280B, and 280C) and other controls via a bus 270 such as an $I^2C$ multimaster serial single-ended computer bus in combination with an $I^2C$ controller 260. As such, in one example, when the SCM 165A receives the specified parameter in the form of a JSON object, the SCM 165A extracts the data from the JSON object to construct appropriate $I^2C$ messages for implementing the instruction as indicated in the parameter. In the forgoing example, to adjust the signage device's volume, the SCM 165A may construct a single $I^2C$ message instructing the volume control to increase or decrease the volume.

Further, in one embodiment, the SCM 165A can monitor embedded sensors (e.g., 280A, 280B, and 280C) for temperature (internal to the signage device and external), and backlight as well as sensors for motion near the signage device or external light (i.e., environment brightness detection). Additionally, according to one embodiment, the SCM 165A can monitor sensors for the life expectancy of the signage device's liquid-crystal display ("LCD") as well as the LCD Timing Controller. Therefore, in one embodiment, an administrator can request a reading of a particular sensor of a signage device. For example, a user could request a reading of the signage device's environment temperature. In one embodiment, upon obtaining a parameter from the DSCS 101 requesting a reading of the signage device's environment temperature sensor, the SCM 165A may request the temperature from the environment temperature sensor through the $I^2C$ bus. Subsequently, the SCM 165A constructs a JSON object containing the information read from the temperature sensor, which is then transmitted to the DSCS 101, according to one embodiment. The DSCS 101 then transmits the JSON object to the administrator's user interface 150, which instructs the user interface 150 to display the temperature information. As noted previously, in one embodiment, such information may be graphically displayed.

As noted, the DSCS 101 is in operative connection with signage device managers via the manager's user interface 150. As indicated, the user interface 150 allows a signage device manager or other administrator to remotely monitor and manage various digital signage functionalities. For example, via the user interface 150, an administrator may input commands to adjust the volume on a signage device or adjust the hue, contrast, or sharpness of an image or other content displayed on a signage device. According to one aspect, an administer inputs such commands via a slider included in the user interface 150.

Further, an administrator may monitor a sensor embedded in a signage device. For example, a signage device may be equipped with sensors for monitoring the device's environment temperature. Further, devices may be equipped with motion sensors to detect people in proximity to the device. In one embodiment, the user interface 150 may be configured such that information from a particular sensor or group of sensors in a particular signage device can be displayed graphically to the administrator. For example, an administrator could request that information from the motion sensor of a particular signage device be displayed for a 48-hour period to determine when the signage device encounters the most traffic.

Additionally, because the Data Store 130 of the DSCS 101 maintains information relating to the various sensors embedded in each signage device (as will be discussed below), an administrator can add or remove sensors from a particular signage device via the user interface 150. For example, in one embodiment, each sensor embedded in a particular signage device is identified by a particular VPC code, which is stored in the Data Store 130. To remove a particular sensor, the administrator simply uses the user interface 150 to indicate the sensor should be removed, whereby the DSCS 101 removes the sensor by removing the VPC code from the Data Store 130. To reverse the process, the administrator indicates via the User Interface 150 that the sensor should be reconnected, and the DSCS 101 adds the VPC back to the database for the particular signage device.

As will be understood by one of ordinary skill in the art, the user interface 150 can be implemented in various forms. For example, the user interface 150 can be implemented by a web browser such as INTERNET EXPLORER, FIREFOX, GOOGLE CHROME, SAFARI, etc. The management webpages displayed at the user interface 150 can utilize JavaScript. Further, the user interface 150 can utilize ADOBE FLASH. The user interface 150 can be implemented in any suitable computing devices such as desktop computers, laptop computers, tablet computers, mobile phones, etc. Such flexibility gives an administrator the freedom to monitor or update signage devices from virtually anywhere.

As indicated, according to the embodiment shown in FIG. 1, the DSCS 101 is in operative connection with a private signage device network 160 via a network 185 (i.e., the internet) connected to a router 180. The DSCS 101 is likewise connected to an independent signage device 162C via a network 185. According to one aspect, to prevent unwanted access to the signage device network 160 or independent signage device 162C by hackers or others with malicious intent, and to prevent unwanted content from gaining access to the signage devices, the DSCS 101 only responds to requests from the signage devices and sends no unsolicited content.

The discussions above in association with FIG. 1 are merely intended to provide an overview of an embodiment of the present system. Accordingly, it will be understood that the descriptions in this disclosure are not intended to limit in any way the scope of the present disclosure. Various architectural details of an embodiment of the disclosed system will be described next in greater detail.

Figure 3:
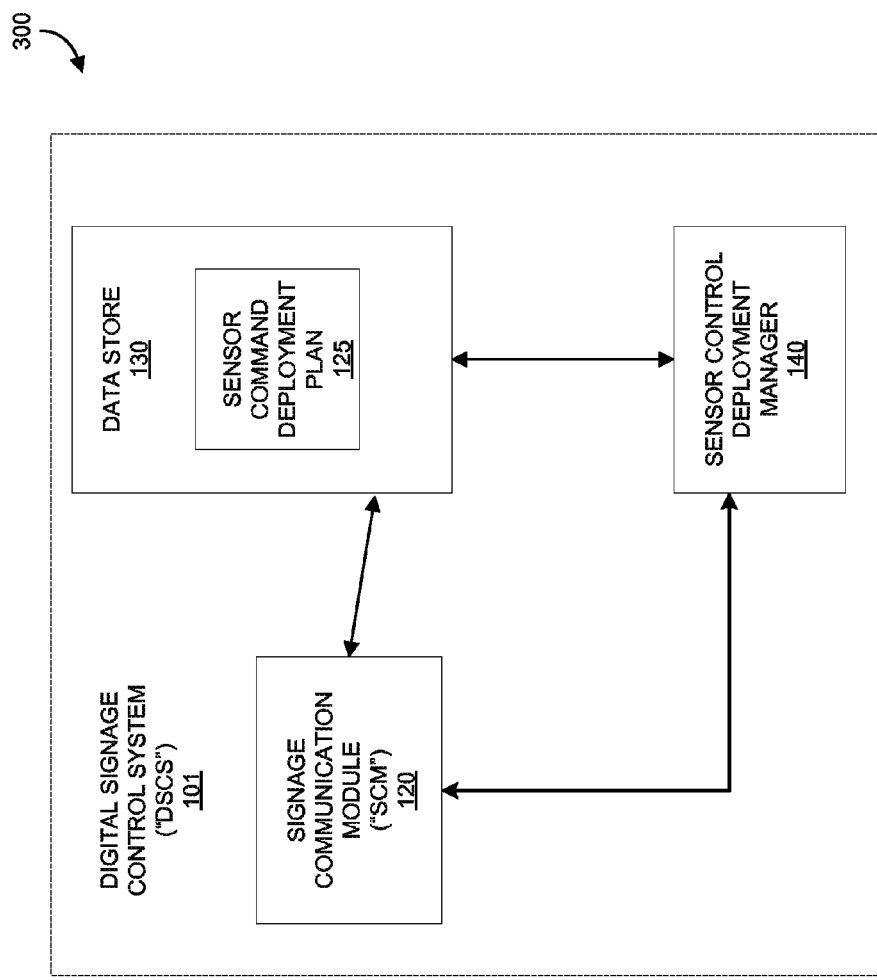
FIG. 3 illustrates an exemplary system architecture of an DSCS, according to one embodiment of the present disclosure.

FIG. 3 illustrates an exemplary system architecture 300 of an DSCS 101 according to one embodiment of the present disclosure. As discussed and according to the embodiment shown in FIGS. 1 and 3, a DSCS 101 is typically a single device comprising a SCM 120, a Data Store 130, a Sensor Control Deployment Manager 140, and various other software engines, modules, and databases, which are operatively connected. According to one embodiment, the various components (i.e., the SCM 120, Data Store 130, and Sensor Control Deployment Manager 140) are servers or collections of software modules comprising databases and various software relating to one or more processes, subroutines, or various algorithms operated by an embodiment of the DSCS 101. In an alternate embodiment, a DSCS 101 may be hosted on a third-party physical structure or a cloud server, such as a scalable Internet-based storage service, and though not shown, components of an DSCS 101 hosted in a cloud server may be operatively connected and communicate via a network 185 (i.e., via the Internet).

In the disclosed embodiment, the Data Store 130 is in communication with both the SCM 120 and the Sensor Control Deployment Manager 140. In particular, the Data Store 130 receives a write instruction from the Sensor Control Deployment Manager 140 specifying content and other information to be stored in the storage service in association with a particular Command Deployment Plan. Additionally, the Data Store 130 stores information relating to all signage devices in communication with the DSCS 101. For example, the Data Store 130 maintains records of the identities of all signage devices in communication with the DSCS 101 as well as the public IP addresses of those devices. In addition to the public IP addresses of the signage devices, the Data Store 130 also maintains information relating to the various sensors embedded in each signage device. Further, the Data Store 130 stores historical data relating to the signage devices (e.g., sensor control commands that have been sent to the devices previously, etc.), and other such information.

In general, the Sensor Control Deployment Manager 140 in accordance with a user's instructions received via the user interface 150 coordinates deployment of one or more sensor command deployment plans (e.g., 125) stored in the data store 130 to one or more signage devices. Via the user interface 150, the user can directly specify adjustments of particular properties associated with the signage device (e.g., volume, hue, gamma, etc.), can request a check of a signage device's sensors (e.g., temperature, motion, etc.), or can add or remove a particular sensor. As noted previously, according to various embodiments, data objects representing the instructions or commands may be in the JSON format, may be a CSV file, or may be in an XML-based format. In one embodiment, via the user interface 150, users can specify a time for adjusting a property or checking a sensor. Further, during a particular user session, via the user interface 150, a user can input various commands for multiple signage devices to be carried out at various times. The Sensor Control Deployment Manager 140 then utilizes determination logic to determine the specific timeslots and signage displays for adjusting the properties, checking sensors, etc., in accordance with the user's criteria.

For example, as noted previously, via the user interface 150 a user may instruct the Sensor Control Deployment Manager 140 to deploy various commands and other instructions (e.g., check temperature or remove motion sensor) to various signage devices at various times. Based on the user's instruction, the Sensor Control Deployment Manager 140 can construct a Sensor Command Deployment Plan 125 (i.e., an instruction for deploying instructions and commands), which, according to one embodiment, can include information relating to the particular instructions. Specifically, a Sensor Command Deployment Plan 125 identifies particular deployment information. This deployment information can include a group ID, which identifies which group of signage devices have been selected to receive a particular commend or instruction. Further, the deployment information can include a signage device ID, which identifies a specific signage device selected to receive a specific command. For example, using a group ID, a user can deploy an instruction to simultaneously adjust the volume on all signage devices in a network at a predetermined time. Alternatively, using a signage device ID, a user could create an instruction to turn off the backlight of a particular signage device.

Additionally, according to one embodiment, the deployment information can include time slot information, which indicates the date(s) and time(s) when an instruction or command should be carried out. Again, a user could specify that the backlights on all signage devices within a particular network are to be turned off at a particular time each day. Alternatively, if an extended weather report suggested a particularly cloudy day was approaching, a user could specify the brightness of a particular outdoor signage device should be maximized on that particular day. Further, in one embodiment, a Sensor Command Deployment Plan 125 groups all commands, instructions, and other information pertaining to a particular signage device as parameters specific to that particular signage device. In such an embodiment, a particular Sensor Command Deployment Plan 125 may comprise one or more parameters, each of which is specified to be deployed to a particular signage device.

In certain embodiments, after the Sensor Control Deployment Manager 140 determines a Sensor Command Deployment Plan 125 via the user interface 150, the user can review the deployment plan and then instruct the Sensor Control Deployment Manager 140 to execute the deployment plan. The Sensor Control Deployment Manager 140 informs the Signage Communication Module 120 that the specific plan is ready to be deployed. For example, the Sensor Control Deployment Manager 140 can store a deployment plan to the Data Store 130 and identify that deployment plan with a deployment plan ID. Subsequently, the Sensor Control Deployment Manager 140 can send the deployment plan ID to the SCM 120 and then request the SCM 120 to deploy that plan via a deployment instruction.

In the specific embodiment shown in FIG. 3, the Sensor Control Deployment Manager 140 includes a function for a transmitting a deployment instruction to a SCM 120. According to one aspect, a deployment instruction comprises a plan ID, which is a combination of alphanumeric characters and other symbols that identify a particular Sensor Command Deployment Plan 125, as discussed above.

According to the disclosed embodiment, the Signage Communication Module ("SCM") 120 can be in communication with one or more signage device networks and independent signage devices. As described above, the SCM 120 can receive a deployment instruction from the Sensor Control Deployment Manager 140. Generally, the deployment instruction informs the SCM 120 that a specific plan is ready to be deployed to the intended signage devices. The SCM 120 can then use the plan ID to obtain the specific deployment plan. When a signage device next inquires the SCM 120 as to whether there is an instruction or command for the device, the SCM 120 can then deploy the particular parameters intended for the particular signage device.

In certain embodiments, the Sensor Control Deployment Manager 140 instructs the SCM 120 that a particular plan is ready to be deployed by sending a plan ID to the SCM 120 in a message. Using the plan ID, the SCM 120 can retrieve a deployment plan from the Data Store 130. As described above, the deployment plan specifies detail information regarding commands and instructions should be carried out at which signage device and at which timeslots.

In certain embodiments, a signage device can periodically send requests to the SCM 120 to check if there are commands or instructions available for that signage device. The SCM 120, in turn, can examine the deployment plans to determine whether commands are to be deployed to that signage device and then forward the commands accordingly.

In certain embodiments, an DSCS 101 utilizes a data store 130 such as a database to store Sensor Command Deployment Plans 125 and other information utilized by the system (e.g., information relating to the location of signage devices, signage device networks, etc.), thus allowing other modules in the DSCS 101 to both write to and retrieve (i.e., read) from the data store 130. Particularly, the data store 130 stores data specifying all of the signage devices 162 managed by the DSCS 101 and all the sensors and other managed components of each signage device 162.

The user interface 150 allows a user to view all the data stored in the data store 130 and modify the data. Parameters and the configurations of a new signage device 162 can be added to the data store. Subsequently, based on those parameters and the configurations, the DSCS 101 can recognize the new signage device 162 and start managing the new signage device 162. Similarly, additional sensors or components of a managed signage device 162 can be added into or deleted from the data store. In certain embodiments, a sensor or component can be added by indicating its VPC code. By using the VPC code, the DSCS 101 can retrieve the necessary parameters and the configurations from a resource center in the network.

As indicated, according to the embodiment shown in FIG. 1, the DSCS 101 may be in operative connection with a private signage device network 160 via a network connected to a router 180 or similar device, which manages communications between the various components of the DSCS 101 and a signage device network. Further, signage devices within the network are assigned private IP address specific to the network. According to the preferred embodiment, as signage devices within the network only respond to conversations originated within the network, the router utilizes a process such as network address translation ("NAT"). This NAT process allows the router 180 to serve as an agent between the signage device network and the DSCS 101 while maintaining the private IP addresses of the signage devices in the network. According to one embodiment, the router 180 utilizes NAT to map the private IP addresses to registered public IP addresses, which can be identified by the DSCS 101 such that appropriate content can be delivered to the signage devices.

Figure 4:
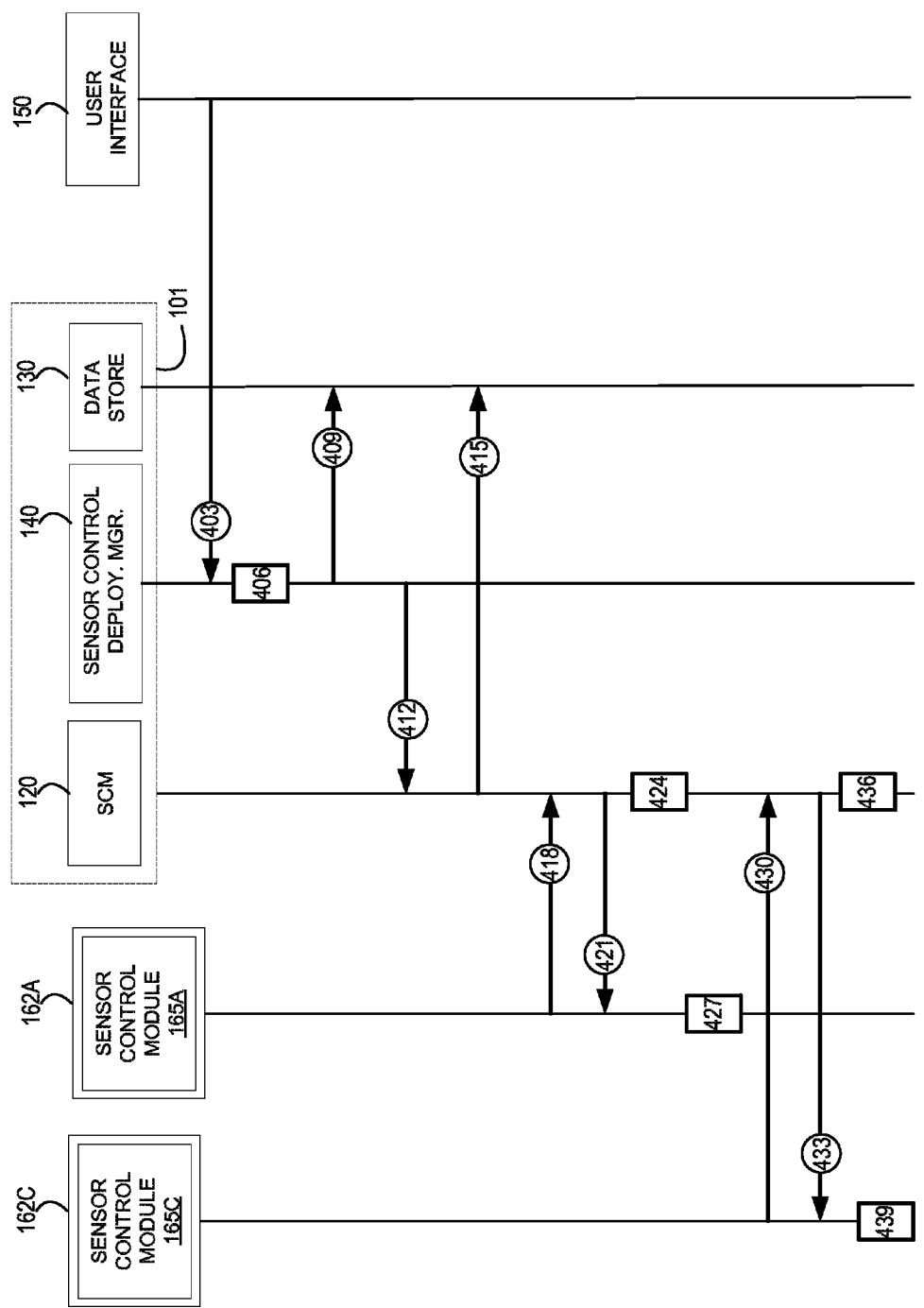
FIG. 4 is a sequence diagram showing an exemplary computer-implemented process wherein a DSCS receives a sensor command and subsequently receives a request for sensor instructions from a signage device. The sequence diagram shows the steps whereby the sensor command is processed and delivered to specified signage devices.

FIG. 4 is a sequence diagram illustrating an exemplary computer-implemented process wherein a DSCS receives various sensor commands and instructions from a user via a user interface 150 and subsequently generates a Sensor Command Deployment Plan and deploys parameters from the plans to particular signage devices upon receiving a request for sensor instructions from a signage device. In the particular example, a DSCS 101 is in operative connection with a sensor control module 165A of a signage device 162A in a signage device network as well as a sensor control module 165C of an independent signage device 162C.

As shown in FIG. 4, according to one embodiment, at operation 403, a Sensor Control Deployment Manager 140 receives various sensor commands and instructions from a user via a user interface 150. As noted previously, a user's instructions may include specific instructions for adjusting properties associated with the signage device (e.g., the volume) or for checking a sensor (e.g., temperature). Further, a user could specify that a particular sensor be added to or removed from a particular signage device. Upon receipt of the various commands and instructions, the Sensor Control Deployment Manager 140 generates a Sensor Command Deployment Plan (e.g., 125), at operation 406. As noted previously, a Sensor Command Deployment Plan is an instruction for deploying instructions and commands to the various specified signage devices that includes deployment information such as a group ID or signage device ID. Further, in constructing a Sensor Command Deployment Plan, according to the disclosed embodiment the Sensor Control Deployment Manager 140 also associates a deployment plan ID with the deployment plan.

As further shown in the FIG. 4 embodiment, upon construction of the deployment plan, at operation 409, the Sensor Control Deployment Manager 130 transmits the deployment plan to the Data Store 130 for storage. Further, at operation 412, the Sensor Control Deployment Manager 130 transmits the deployment plan ID to the SCM 120. Then, at operation 415, the SCM 120 retrieves the deployment plan from the Data Store 130 based on the deployment plan ID, according to the FIG. 4 embodiment.

Upon receipt of the deployment plan, the SCM 120 waits for an inquiry from a signage device specified in the deployment plan. As discussed previously, according to one embodiment, signage device networks and independent signage devices are configured such that they receive no incoming information unless they first request information. After an unspecified period of time, the SCM 120 receives an inquiry from one of the Sensor Control Modules (i.e., 165A) of one of the signage devices specified in the deployment plan at operation 418. According to one aspect, the SCM 120 can be configured to discard the deployment plan after a predetermined time period. As will be understood and appreciated, discarding a deployment plan after a specified time period will prevent unnecessary use of resources where a signage device network is nonfunctioning or failing to query for content for some reason. Also, though not shown in FIG. 4, it will be understood by one of ordinary skill in the art that as discussed previously, a router or similar device manages communications between the various components of the DSCS 101 and the signage device network (e.g., 160).

As shown in FIG. 4, the Sensor Control Module 165A of the signage device 162A receives from the SCM 120 the parameters specified for the particular signage device, at operation 421. As noted previously, according to one embodiment, the Sensor Command Deployment Plan comprises one or more parameters specific to one or more particular signage devices, containing the commands, instructions, and other information pertaining to the particular signage device. Continuing to operation 424, after transmitting the parameters to the particular signage device, the SCM 120 updates the Sensor Command Deployment Plan to indicate the particular parameter has been delivered to the proper signage device. Moving to operation 427, upon receipt of the parameters, the Sensor Control Module 165A appropriately executes the command or instruction specified by the parameter and at the time specified in the manner described previously.

Continuing to operation 430, the process continues as described above in relation to operations 418-427. A Sensor Control Module 165C of a second signage device (i.e., independent signage device 162C) transmits an inquiry to the SCM 120. As before, at operation 433 the SCM 120 transmits the appropriate parameters to the Sensor Control Module 165C and then updates the deployment plan at operation 436. Finally, the Sensor Control Module 165C executes the command or instruction as specified.

Though not shown in FIG. 4, according to one aspect, a Sensor Command Deployment Plan may comprise a single parameter or many. Further, a SCM 120 may be managing one or more Sensor Command Deployment Plans at any one time.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising:
    a management server configured to
        receive a user input from a remote computing device, wherein the user input includes information relating to a management function at a sensor of a digital signage device;
        construct an instruction comprising parameters for performing the management function;
        upon receipt of a request for instruction, transmit the instruction to the digital signage device;
    the digital signage device comprising a processor, a controller in accordance with a control protocol, the sensor in communication with the controller, and a non-volatile memory storing a computer-executable program that, when executed by the processor, is configured to
        request the instruction from the management server;
        receive the instruction from the management server;
        construct a command corresponding to the management function in accordance with the control protocol;
        transmit the command to the sensor via the controller.

2. The system of claim 1, wherein the management function includes managing signage device functionalities.

3. The system of claim 2, wherein the device functionalities include adjusting picture-related properties from a group consisting of hue, contrast, brightness, sharpness, or gamma.

4. The system of claim 2, wherein the device functionalities include adjusting the volume of the signage device.

5. The system of claim 1, wherein the sensor is configured to monitor conditions internal to the signage device.

6. The system of claim 5, wherein conditions internal to the signage device are selected from a group including temperature and LCD life expectancy.

7. The system of claim 1, wherein the sensor is configured to monitor conditions external to the signage device.

8. The system of claim 7, wherein conditions external to the signage device are selected from a group including temperature and environment brightness.

9. The system of claim 1, wherein the sensor is configured as a motion detector.

10. The system of claim 1, wherein the parameters for performing the management function include a specific date and time for performing the management function.

11. In a computer system comprising a management server and a digital signage device, wherein the digital signage device comprises a controller in accordance with a control protocol, a sensor in communication with the controller, and a non-volatile memory storing a computer-executable program, a method comprising:
    receiving at the management server a user input from a remote computing device, wherein the user input includes information relating to a management function at the sensor;
    constructing at the management server an instruction comprising parameters for performing the management function;
    transmitting from the digital signage device to the management server a request for the instruction;
    upon receipt of the request, transmitting from the management server to the digital signage device the instruction;
    receiving at the digital signage device the instruction from the management server;
    constructing via the processor a command corresponding to the management function in accordance with the control protocol; and
    transmitting the command to the sensor via the controller.

12. The method of claim 11, wherein the management function includes managing signage device functionalities.

13. The method of claim 12, wherein the device functionalities include adjusting picture-related properties from a group consisting of hue, contrast, brightness, sharpness, or gamma.

14. The method of claim 12, wherein the device functionalities include adjusting the volume of the signage device.

15. The method of claim 11, wherein the sensor is configured to monitor conditions internal to the signage device.

16. The method of claim 15, wherein conditions internal to the signage device include at least one of temperature and LCD life expectancy.

17. The method of claim 11, wherein the sensor is configured to monitor conditions external to the signage device.

18. The method of claim 17, wherein conditions external to the signage device include at least one of temperature and environment brightness.

19. The method of claim 11, wherein the sensor is configured as a motion detector.

20. The method of claim 11, wherein the parameters for performing the management function include a specific data and time for performing the management function.

21. A non-transitory computer readable medium storing executable instructions configured to cause a computer system to execute a method comprising:
    receiving at a management server a user input from a remote computing device, wherein the user input includes information relating to a management function at a sensor in a digital signage device, wherein the digital signage device comprises a controller in accordance with a control protocol, and the sensor is in communication with the controller;
    constructing at the management server an instruction comprising parameters for performing the management function;

transmitting from the digital signage device to the management server a request for the instruction;

upon receipt of the request, transmitting from the management server to the digital signage device the instruction;

receiving at the digital signage device the instruction from the management server;

constructing via the processor a command corresponding to the management function in accordance with the control protocol; and transmitting the command to the sensor via the controller.

22. The computer readable medium of claim 21, wherein the management function includes managing signage device functionalities.

23. The computer readable medium of claim 22, wherein the device functionalities include adjusting picture-related properties from a group consisting of hue, contrast, brightness, sharpness, or gamma.

24. The computer readable medium of claim 22, wherein the device functionalities include adjusting the volume of the signage device.

25. The computer readable medium of claim 21, wherein the sensor is configured to monitor conditions internal to the signage device.

* * * * *